United States Patent [19]
English

[11] Patent Number: 5,870,674
[45] Date of Patent: *Feb. 9, 1999

[54] METHOD AND APPARATUS FOR PERFORMING PREFERRED SYSTEM SELECTION

[75] Inventor: Sean English, Del Mar, Calif.

[73] Assignee: Qualcomm Incorporated, San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 626,743

[22] Filed: Mar. 27, 1996

[51] Int. Cl.⁶ ........................................... H04Q 7/20
[52] U.S. Cl. ........................ 455/432; 455/426; 455/456
[58] Field of Search ................... 455/33.1, 33.2, 455/33.4, 34.1, 34.2, 54.1, 56.1, 422, 426, 432, 434, 435, 436, 448, 552–553, 561, 440–444, 524–525, 551, 186.1, 456; 379/59, 60

[56] References Cited

U.S. PATENT DOCUMENTS

| | | | |
|---|---|---|---|
| 4,112,257 | 9/1978 | Frost | 179/2 EB |
| 4,756,007 | 7/1988 | Qureshi et al. | 375/37 |
| 4,763,322 | 8/1988 | Eizenhofer | 370/95 |
| 4,795,210 | 1/1989 | Milat | 297/194 |
| 4,905,301 | 2/1990 | Krolopp et al. | 455/34 |
| 4,916,728 | 4/1990 | Blair | 455/33.1 |
| 5,020,091 | 5/1991 | Krolopp et al. | 379/60 |
| 5,123,111 | 6/1992 | Delory et al. | 455/34.1 |
| 5,159,625 | 10/1992 | Zicker | 379/59 |
| 5,239,294 | 8/1993 | Flanders et al. | 340/825.34 |
| 5,267,244 | 11/1993 | Messerschmitt et al. | 370/95.3 |
| 5,442,806 | 8/1995 | Barber et al. | 455/54.1 |
| 5,537,674 | 7/1996 | Kishimoto et al. | 455/186.1 |
| 5,586,338 | 12/1996 | Lynch et al. | 455/54.1 |
| 5,613,204 | 3/1997 | Haberman et al. | 455/432 |
| 5,625,351 | 4/1997 | Willard et al. | 455/432 |

FOREIGN PATENT DOCUMENTS

| | | | |
|---|---|---|---|
| 0347167 | 12/1989 | European Pat. Off. | H04Q 7/04 |
| 0777399 | 6/1995 | European Pat. Off. | H04Q 7/32 |
| 0723147 | 8/1995 | Japan | H04Q 7/28 |
| 0724577 | 9/1995 | Japan | H04Q 7/34 |
| 8251056 | 9/1996 | Japan | H04B 1/16 |
| 2267795 | 12/1993 | United Kingdom | H04Q 7/04 |
| 9316548 | 8/1993 | WIPO | H04M 11/00 |
| 9427398 | 11/1994 | WIPO | H04M 11/06 |
| 9507010 | 3/1995 | WIPO | H04Q 7/32 |

*Primary Examiner*—Nguyen Vo
*Attorney, Agent, or Firm*—Russell B. Miller; Bruce W. Greenhaus; Kent D. Baker

[57] ABSTRACT

A method and apparatus for selecting a communication system in accordance with geographic region of the subscriber station. The subscriber station first attempts to determine its geographic region. It does so by attempting to acquire a system which covers the region. Once the subscriber station has determined its geographic region, the subscriber station then determines whether the acquired system is the most desirable system for use in the geographical region. If it is the most desirable system for use in the geographical region, the subscriber station registers with the acquired system. If it is not the most desirable system for use in the geographical region, the subscriber station attempts to acquire a more desirable system.

4 Claims, 4 Drawing Sheets

METHOD AND APPARATUS FOR PERFORMING PREFERRED SYSTEM SELECTION

BACKGROUND OF THE INVENTION

I. Field of the Invention

The present invention relates to communication systems. More particularly, the present invention relates to a novel and improved method and apparatus for selecting a preferred communication system in a subscriber station capable of operation in a plurality of geographical regions.

II. Description of the Related Art

As mobile communication systems become more prevalent in society the demands for greater and more sophisticated service have grown. To meet the capacity needs of mobile communication systems, techniques of multiple access to a limited communication resource have been developed. The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems.

The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention and is incorporated by reference herein. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention and is incorporated by reference herein.

When the user of a subscriber station travels from one geographic region to another, the subscriber station must select a communications system upon which to conduct services. There are two means by which a user may operate his subscriber station in differing geographic locations. By the first method, the user subscribes to communications services in a variety of locations. Thus, the subscriber station needs only to seek out a communications system to which the user subscribes and is authorized to receive services from any of those service providers.

Alternatively, the user may communicate by means of roaming service. Mobile communications providers negotiate contracts among themselves to provide services known as "roaming" to their customers. A "roamer" is a subscriber station which requires service in a system which is operated by a communications service provider other than the ones to which the user subscribes. Currently, when a subscriber station is roaming, a signal indicative of the roaming condition is provided to the user. A roaming determination is made as a result of a comparison of the system identification (SID) of the subscribed system or systems with the SID of the system providing service which is broadcast by that system. This alerts the user of the subscriber station that the service being provided is accruing roaming charges.

Because the subscriber station is generally without knowledge of the users geographic region, it must determine what system are available and then select a system which provides the optimum service to the user in terms of cost and quality of service. As the number of regions in which the user wishes to be able to operate increases, so does the number of different communications systems that user must attempt to acquire. The present invention provides a method and apparatus for selecting the communication system best suited to the user's needs.

The present invention is described in a multi-mode subscriber station, such as is described in detail in copending U.S. patent application Ser. No. 08/509,719, entitled "METHOD AND APPARATUS FOR SYSTEM DETERMINATION IN A MULTI-MODE SUBSCRIBER STATION", which is assigned to the assignee of the present invention and is incorporated herein by reference. It should be noted that although the present invention is described in the context of a subscriber station capable of operation in analog and digital environments, the present invention is equally applicable to subscriber stations only capable of operation in one environment. Similarly, it should be noted that the digital operation described in the context of code division multiple access (CDMA) operation is equally applicable to any digital communication format such as TDMA, FDMA, GSM, etc.

SUMMARY OF THE INVENTION

In the exemplary embodiment of the present invention, the subscriber station maintains a list of systems, some of which are 'preferred' systems (systems the subscriber station is allowed to use), and some of which are 'negative' systems (systems the subscriber station is not allowed to use). Associated with each system in the list is a system identification (SID) as well as acquisition parameters (band, frequency, mode, etc.). This list is referred to herein as the universal system table.

The universal system table is maintained in such a manner that the subscriber station can readily determine, which systems (preferred or negative) cover common geographical regions. Common geographic regions as referred to herein refers to areas of common radio coverage. Moreover, the systems that cover a common geographical region are prioritized, ranked from most desirable to least desirable. The subscriber station's job is to attempt to acquire service on the most desirable system in the subscriber station's current geographical region. There is no point in trying to acquire service on a system outside of the subscriber station's current geographic region, since system coverage is typically geographically limited.

The problem is that the subscriber station does not necessarily know where it is when it powers on. Due to roaming, it could be in an entirely different region than it was previously. Therefore, it may not be obvious how to acquire any system, let alone the most desirable system.

In the exemplary embodiment of the present invention, the subscriber station maintains a table of systems, which are best suited to determine the subscriber station's geographic region. This list is referred to herein as the geographic hypothesis table. The systems in the geographic hypothesis table are selected on the basis of the speed with which they can be acquired and likelihood that they can be acquired if the subscriber station is within their geographical coverage region. The subscriber station tests each geographical hypothesis by attempting to acquire a system which operates within the geographic region.

In the exemplary embodiment, the subscriber station maintains a list of most recently used systems and an indication of their geographic region in a table referred to herein as the most recently used (MRU) table. In the exemplary embodiment, the subscriber station first selects the geographic hypotheses to test in accordance with the entries in the MRU table. That is the regions to be tested first are those in which the subscriber station has operated recently. In the exemplary embodiment, the next set of geographic hypotheses to be tested are those that have representative acquisition parameters. By attempting to acquire one of these "representative" systems a plurality of geographic hypotheses having identical acquisition parameters are simultaneously tested. If neither of these methods is successful in acquiring a system, then the remaining systems in the geographic hypothesis table are tested.

Once the subscriber station acquires a system, the subscriber station can pick up the acquired system's SID from an overhead message. The subscriber station uses the received SID to determine its geographic region. It should be noted that the subscriber station can obtain this geographic information whether the system acquired is preferred or negative.

The subscriber station then performs attempts to acquire a system within the geographic region that is most desirable for the user's needs. Since systems in the universal system table are grouped according to geographic region then listed sequentially from most desirable to least desirable, this search procedure is performed by going to the correct group of systems and sequentially attempting to acquire each of the preferred systems in that group from most desirable to least desirable.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
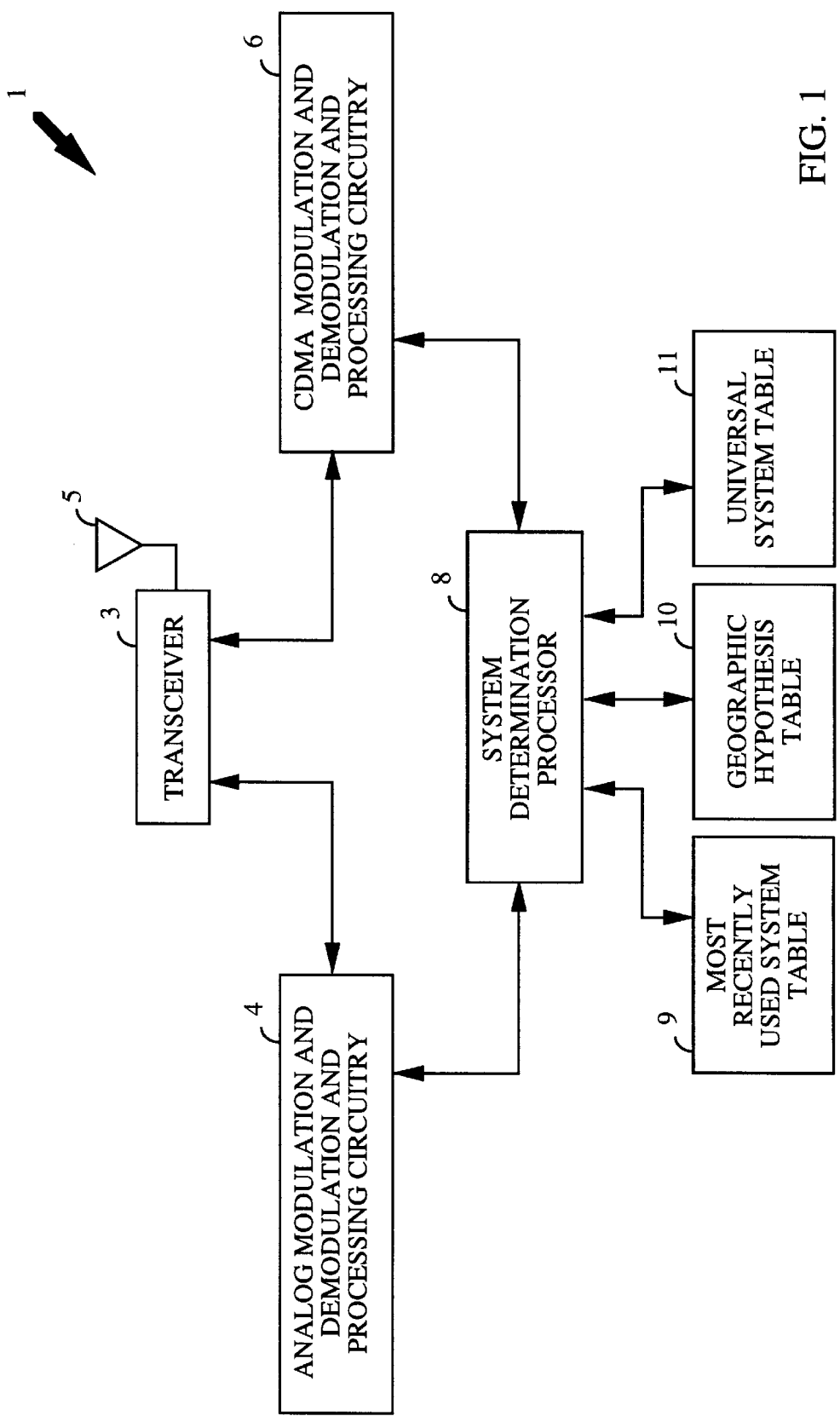
FIG. 1 is a block diagram of the exemplary multi mode subscriber station in the present invention.

Referring to FIG. 1, when multi-mode subscriber station MMSS 1 is in a system determination substate, operations are conducted by system determination processor 8. In the system determination substate, system determination processor 8 selects the communication system upon which MMSS 1 attempts to perform acquisition and provides the necessary parameters to the acquisition circuitry.

In the exemplary embodiment, MMSS 1 is a dual mode subscriber station capable of both analog transmission and reception, using analog modulation and demodulation and processing circuitry (analog circuitry) 4, and code division multiple access (CDMA) transmission and reception using CDMA modulation and demodulation and processing circuitry (CDMA circuitry) 6. The design of analog circuitry 4 is well known in the art and is described in detail in *Mobile Cellular Telecommunications Systems* by William C. Y. Lee. The exemplary embodiment of CDMA circuitry 6 is described in detail in the aforementioned U.S. Pat. Nos. 4,901,307 and 5,103,459.

Most recent use (MRU) table 9 contains a list of communication systems that have been most recently used by MMSS 1. In the exemplary embodiment, MRU table 9 is implemented in non-volatile memory which is retained even after MMSS 1 is powered down.

Geographic hypothesis table 10 contains a list of system identifications (SIDs) each located in a different geographic region and necessary acquisition parameters including band, frequency, mode and any other parameters necessary to perform acquisition on that system. In the exemplary embodiment, geographic hypothesis table 10 is implemented in non-volatile memory which is retained even after MMSS 1 is powered down. It is envisioned that there may be cases where more than one system may be needed to test a single geographic hypothesis, in these cases geographic hypothesis table 10 will contain more than one system for that region and that geographic hypothesis will be tested by attempting to acquire each of the systems listed for that region. In the exemplary embodiment, the systems listed in geographic hypothesis table 10 have been selected in accordance with the speed and likelihood that the system can be acquired. In the exemplary embodiment, geographic hypothesis table 10 contains both preferred and negative systems.

Universal system table 11 contains system parameters for all communication systems which MMSS 1 "knows" exist. In the exemplary embodiment, universal system table 11 contains information regarding both preferred and negative systems. In the exemplary embodiment, the systems stored in universal system table 11 are grouped according to geographic region, each system listed within a geographic group is then sequentially ordered from most desirable to least desirable. For each system, universal system table 11 contains the system identification along with the necessary acquisition parameters including band, frequency, mode and any other parameters necessary to perform acquisition. In the exemplary embodiment, each system listed is tagged with a indication of whether the system is a system the subscriber station is permitted to use (a preferred system) or a system which the subscriber station is not permitted to use (a negative system).

Figure 2A:
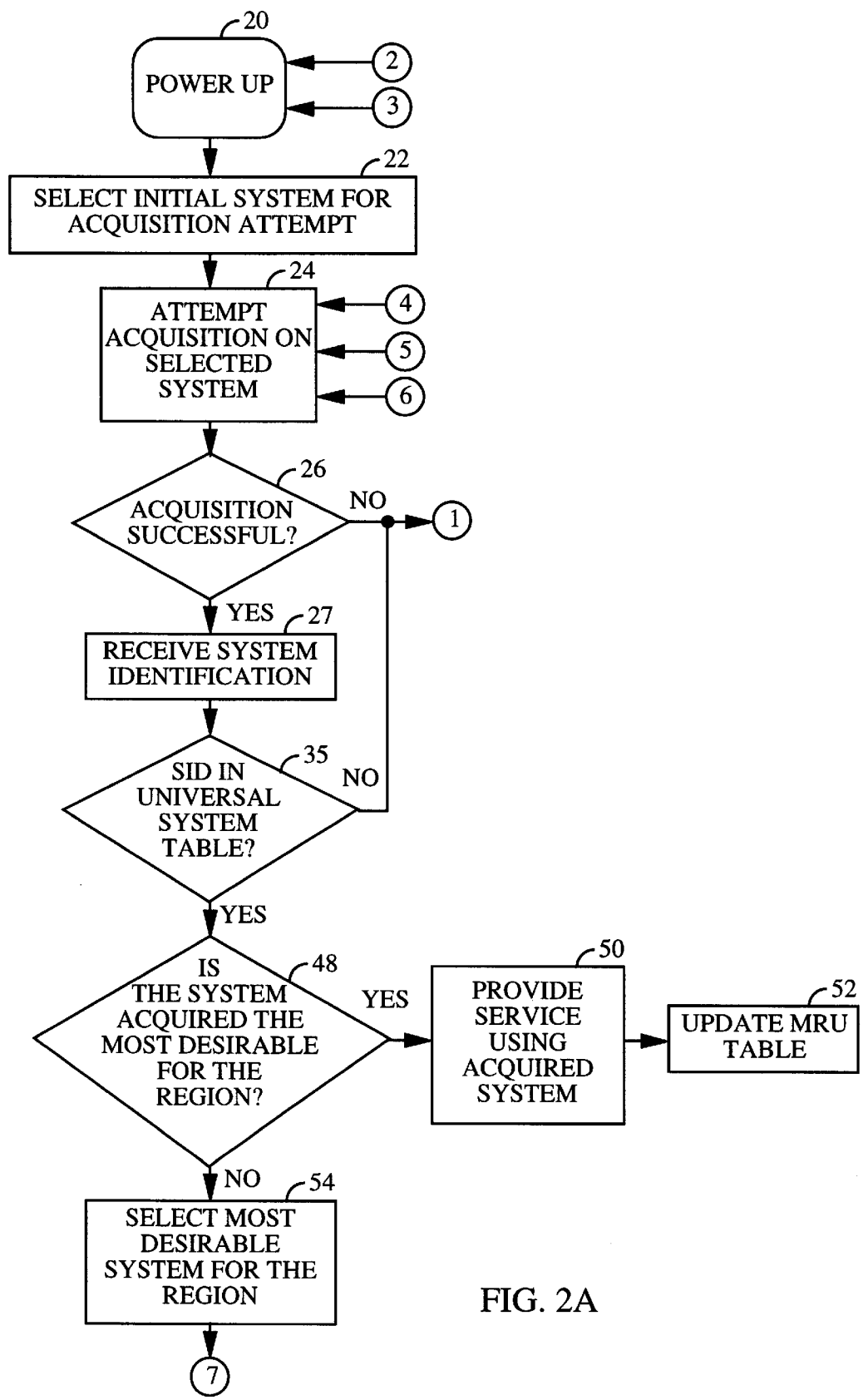
FIG. 2 is a flow diagram illustrating the exemplary system selection process of the present invention.
Figure 2B:
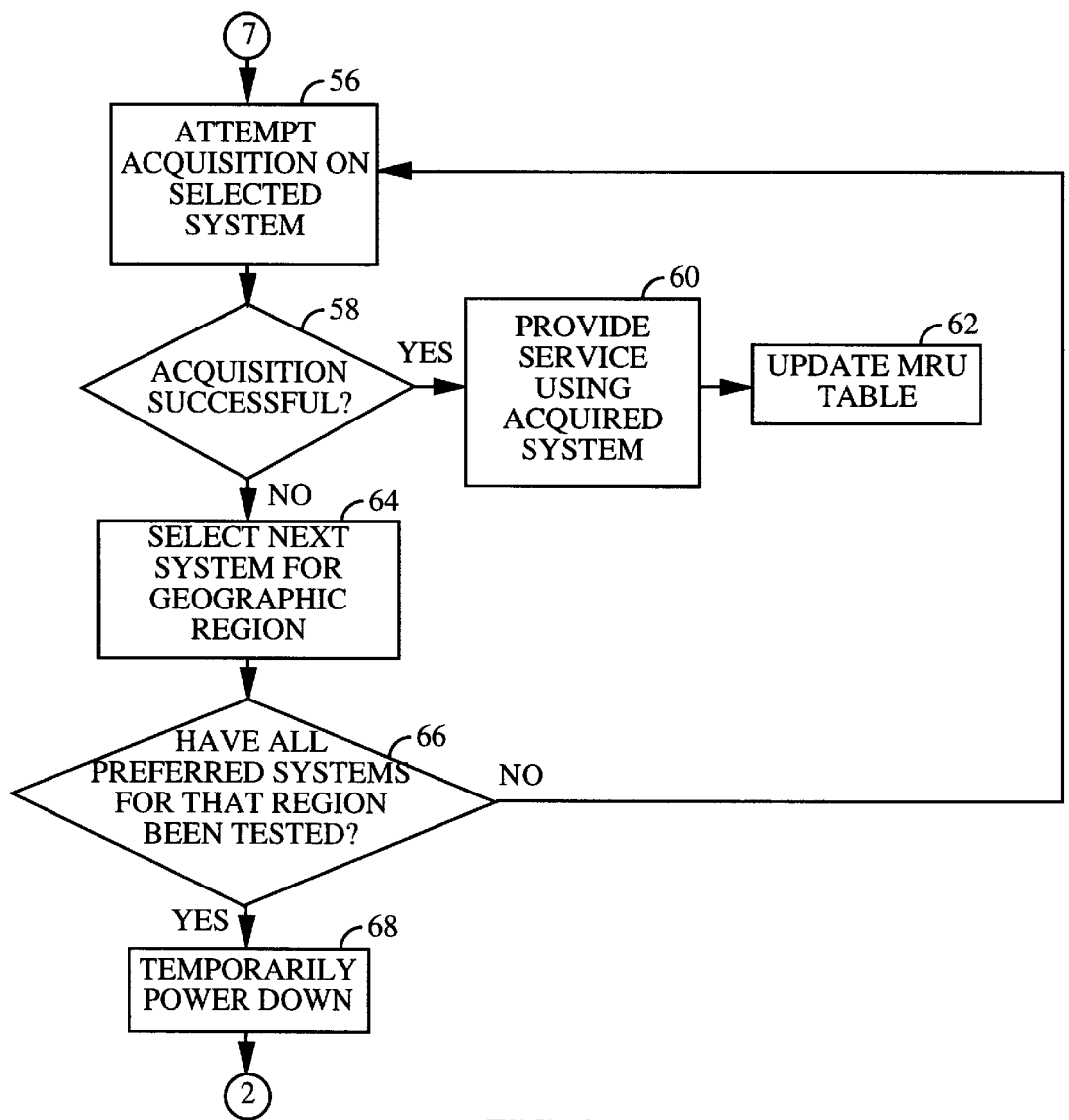
Figure 2C:
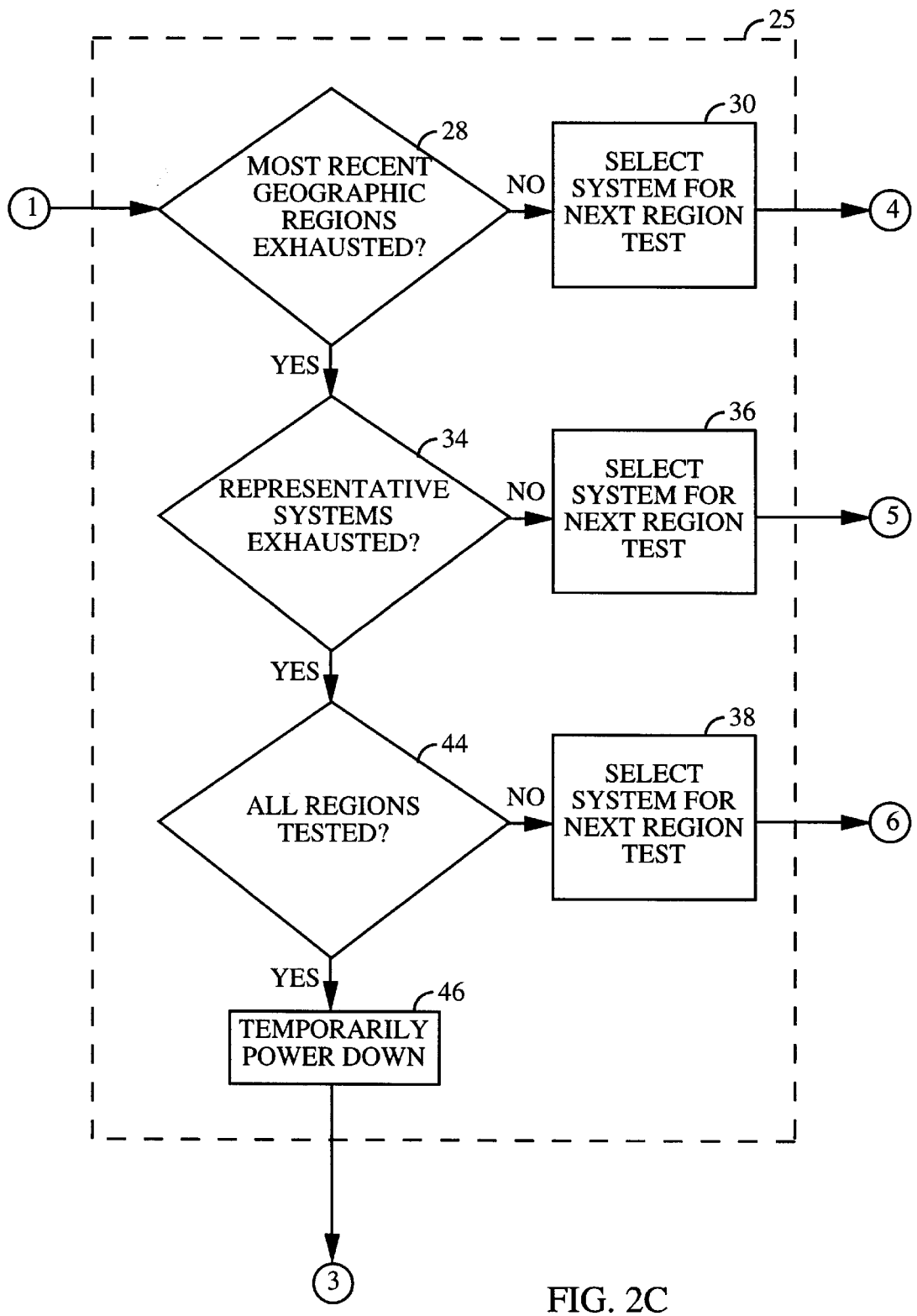

FIG. 2 is a flowchart illustrating the exemplary method of preferred system selection of the present invention. Upon power up (block 20), MMSS 1 enters the system determination substate and control is handed to system determination processor 8. In block 22, system determination processor 8 selects the initial system upon which to attempt acquisition. This system tests a geographic hypothesis. For example, if MMSS 1 is to determine whether it is operating in San Diego, then system determination processor 8 selects the system or systems from geographic hypothesis table 10 which covers the San Diego region and which have been selected to test that hypothesis.

In the exemplary embodiment, system determination processor 8 initially determines the geographic region to test in accordance with systems listed in MRU table 9. In the exemplary embodiment, system determination processor selects, as the system for initial acquisition, the geographic region of the last system used to provide service to MMSS 1. In an alternative embodiment, system determination processor 8 selects the region in which MMSS 1 is most frequently used. Having determined which region should be tested, system determination processor 8 retrieves the system to test the hypothesis from geographic hypothesis table 10.

In the exemplary embodiment, geographic hypothesis table 10 contains necessary acquisition parameters for the selected system. In an alternative embodiment, system determination processor retrieves the identity of the system from geographic hypothesis table 10 and then retrieves the acquisition parameters for the selected system from universal system table 11.

If the system selected for initial acquisition is an analog system, system determination processor 8 provides the system parameters to analog circuitry 4 and provides necessary frequency information to transceiver 3. In block 24, transceiver 3 down converts and amplifies the signal (if present) and provides the signal to analog circuitry 4 which demodulates the received signal and determines whether acquisition is successful.

In block 22, if the preferred system is a CDMA system, system determination processor 8 provides the system parameters to CDMA circuitry 6 and provides necessary frequency information to transceiver 3. In block 24, transceiver 3 down converts and amplifies the signal (if present) and provides the signal to CDMA circuitry 6 which demodulates the received signal and determines whether acquisition is successful.

In block 26, if the acquisition attempt is unsuccessful, then control is returned to system determination processor 8 in block 25. System determination processor 8 selects the next system to be acquired. In the exemplary embodiment, MMSS 1 first tests all geographic regions in which MMSS 1 has recently operated. This is determined in accordance with information in MRU table 9. If tests of those regions are unsuccessful, then MMSS 1 attempts to acquire a "representative" system. A representative system is one which has acquisition parameters that are common to a plurality of other systems. Thus, by attempting acquisition on a representative system, MMSS 1 is actually testing a plurality of geographical hypotheses simultaneously. If none of these systems can be acquired, then MMSS 1 exhaustively attempts acquisition on the remaining regions in geographical hypothesis table 10.

When, in block 26, acquisition of the system selected by system determination processor 8 is unsuccessful, the operation moves to block 28. Block 28 determines whether all geographic regions where MMSS 1 is known to have recently operated have been tested. If there are regions in which MMSS 1 has operated recently which have not been tested, then system determination processor 8 selects a region to test in accordance with information from the MRU table 9. Then, in block 30, system determination processor 8 retrieves the acquisition parameters to test the geographical hypothesis from geographical hypothesis table 10.

System determination processor 8 selectively provides the system acquisition parameters to analog circuitry 4, CDMA circuitry 6 and transceiver 3, as described above. Acquisition upon the selected system is then attempted in block 24 as described above.

If all geographic regions in which MMSS 1 has recently operated have been tested, then MMSS 1 attempts acquisition on "representative" systems. In block 34, if MMSS 1 has not attempted to acquire all representative systems, then, in block 36, system determination processor 8 selects a representative system from geographic hypothesis table 10. System determination processor 8 selectively provides the system acquisition parameters to analog circuitry 4, CDMA circuitry 6 and transceiver 3, as described above. Acquisition upon the selected system is then attempted in block 24 as described above.

If acquisition attempts have been made on all "representative" systems in block 34 then MMSS 1 exhaustively attempts acquisition on the remaining systems in geographic hypothesis table 10. In block 44, if there are geographic hypotheses in geographic hypothesis table 10 which have not been tested, then the flow moves to block 38. In block 38, system determination processor 8 selects a remaining geographical hypothesis, and retrieves the acquisition parameters from geographic hypothesis table 10 and selectively provides the system acquisition parameters to analog circuitry 4, CDMA circuitry 6 and transceiver 3, as described above. Acquisition upon the selected system is then attempted in block 24 as described above.

If attempts to test all geographic hypotheses have failed, then in the exemplary embodiment, in block 40, MMSS 1 temporarily powers down to save battery power and then begins the process of preferred system selection over again at a later predetermined time in block 20. There are several possible alternative courses of action. One possible alternative is MMSS 1 simply powers down. A second possible alternative is MMSS 1 begins the process of preferred system selection over again immediately. A third possible alternative, MMSS 1 indicates the failure and awaits user intervention.

Upon successful acquisition, the system acquired broadcasts a system identification (SID) which is received in block 27, by antenna 5 and provided to transceiver 3 where the message signal is down converted and amplified. If the acquired system is analog, the message is provided to analog circuitry 4, which demodulates the signal in accordance with an analog demodulation format and provides the system identification information to system determination processor 8. If the acquired system is CDMA, the message is provided to CDMA circuitry 6, which demodulates the signal in accordance with a CDMA demodulation format and provides the system identification information to system determination processor 8.

In block 35, system determination processor 8 determines whether the received SID is one of the systems stored in universal system table 11. If the acquired system is unknown to MMSS 1, then the flow is passed back to block 25 and MMSS 1 attempts to acquire a different system. In a preferred embodiment, the acquisition parameters of the acquired but unknown system are retained by system determination processor 8 and that system is used if MMSS 1 is unable to acquire a preferred system.

If the received system identification (SID) is listed in universal system table 11, then system determination processor 8 determines whether this is a most desirable system for the geographical region in block 48. If the system acquired is the most desirable system for the geographical region, then service is provided using the acquired system in block 50. Upon completion of service, system determination processor 8 updates MRU table 9, in block 52.

If the received system identification is not the preferred system for the geographical region, then system determination processor 8 selects the most desirable system for the geographical region and selectively provides the system acquisition parameters to analog circuitry 4, CDMA circuitry 6 and transceiver 3, as described above. In block 56, MMSS 1 attempts acquisition on the most desirable system in the geographical region as described above. If acquisition is successful, service is provided using the acquired system in block 60. In block 62, system determination processor 8 updates MRU table 9.

If acquisition is unsuccessful, then in block 64, system determination processors 8 selects the next most desirable system for use in the geographic region. If there are remaining preferred systems upon which to attempt acquisition, in block 66, then system determination processor 8 selectively provides the system acquisition parameters to analog circuitry 4, CDMA circuitry 6 and transceiver 3, as described above.

If attempts to acquire all preferred systems in the geographic region have failed, then in the exemplary embodiment, in block 68, MMSS 1 temporarily powers down to save battery power and then begins the process of preferred system selection over again at a later predetermined time in block 20. There are several possible alternative courses of action. One possible alternative is MMSS 1 simply powers down. A second possible alternative is MMSS 1 begins the process of preferred system selection over again immediately. A third possible alternative, MMSS 1 indicates the failure and awaits user intervention.

In an alternative embodiment, upon successful acquisition in block 48, system determination processor 8 determines if the system is preferred. If it is a preferred system, then MMSS 1 immediately provides service using the acquired system and intermittently re-enters the system determination substate to check if a more desirable system in the region can be acquired.

In an alternative embodiment, a central communications station may assist MMSS 1 by broadcasting an indication of the geographical region in addition to its SID. This would enable a subscriber station to immediately move to system selection within the geographic region upon acquisition of a system providing this information.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for system acquisition in a subscriber station comprising the steps of:

providing a system table containing an entry for each communication system known to the subscriber station, each entry containing a system identification corresponding to each communication system, each entry further containing aquisition parameters used to acquire the communication system, said entries within said system table being organized by geographic region and including entries for each of a plurality of geographic regions, each geographic region containing information regarding the relative desirability of each communication system within that geographic region;

storing said system table within the subscriber station;

determining a first geographical region hypothesis in accordance with a geographical region of a most recently used system;

performing, in accordance with said first geographical region hypothesis, a first geographical region hypothesis search of said system table for a first communication system;

extracting, from said system table, aquisition parameters corresponding to said first communication system, and attempting to acquire said first communication system using said extracted acqisition parameters;

receiving a system identification from an acquired communication system, said received system identification corresponding to one of the system identifications listed in said system table;

determining from said system table an actual geographical region based on said received system identification; and performing an actual geographical region search of said system table for a second communication system in accordance with said actual geographic region and said desirability information.

2. The method of claim 1 further comprising the steps of in determining a second geographical region hypothesis in accordance with a set of representative acquisition parameters if said first geographical region hypothesis search is unsuccessful; and performing a second geographical region hypothesis search in accordance with said second geographical region hypothesis.

3. The method of claim 2 further comprising the steps of determining a third geographical region hypothesis in accordance with a set of remaining preferred systems if said second geographical region hypothesis search is unsuccessful; and performing a third geographical region hypothesis search in accordance with said third geographical region hypothesis.

4. The method of claim 1 wherein said system identification comprises a message indicating geographic location.

\* \* \* \* \*